Oct. 13, 1925.

O. R. SWEENEY

BASE EXCHANGE WATER SOFTENER

Filed Feb. 9, 1925

Inventor:
Orland R. Sweeney
By Wilson & McCanna
Attys.

Patented Oct. 13, 1925.

1,557,117

UNITED STATES PATENT OFFICE.

ORLAND RUSSELL SWEENEY, OF AMES, IOWA, ASSIGNOR TO WARD-LOVE PUMP CORPORATION, OF ROCKFORD, ILLINOIS, A CORPORATION OF ILLINOIS.

BASE-EXCHANGE WATER SOFTENER.

Application filed February 9, 1925. Serial No. 7,790.

*To all whom it may concern:*

Be it known that I, ORLAND R. SWEENEY, a citizen of the United States, residing in the city of Ames, in the county of Story and State of Iowa, have invented certain new and useful Improvements in Base-Exchange Water Softeners, of which the following is a specification.

This invention pertains to the art of softening water by a system or method generally known as a base-exchange process. The softening is accomplished by passing the water containing the materials which render it hard through a bed or agglomeration of minerals which have the peculiar faculty of exchanging the base, forming part of their composition, for another base mineral present in the water brought into contact with them. These minerals or materials which are used for this purpose are commonly known as zeolites and their composition is various, although they are composed essentially of hydrated silicates of aluminium or hydrated silicates of aluminium and iron with a base.

For most commercial purposes, zeolites containing a sodium base are preferred and will exchange their sodium base for the calcium, magnesium and iron in the hard water, the exchange continuing until the sodium base of the zeolites has been replaced by the bases contained in the hard water. This exchange renders the water soft and the zeolitic material, after use, may be regenerated, i. e., the calcium or magnesium base may be replaced by a sodium base for further water softening, by a solution of sodium chloride. The sodium chloride or brine through chemical reaction with the calcium or magnesium base zeolite replaces the calcium radical with sodium. It is the reversibility of such reactions which render the zeolitic material valuable for water softening processes.

One of the primary purposes of my invention is to improve the process of softening water with base exchange materials with a view to increasing the efficiency thereof by providing improved apparatus for such process.

Apparatus now commonly used for base-exchange water softening have many objectionable features. For instance, the water is permitted to flow through the base-exchange mineral through thick layers of crushed quartz, sand, or sand and gravel, which are necessitated by the character of such apparatus. The water to be softened is allowed to play directly and unevenly upon the mineral or the thick layer or bed of quartz, sand or gravel placed upon the zeolitic material with the result that channels or preferential passages are formed through the sand or gravel beds, and through the mineral, through which the water will flow, without the required contact with the zeolitic material. As a result, but a small portion of the base-exchange material is utilized, and that ineffectively. It has also often been found necessary to filter some waters of impurities or débris carried in suspension before the water reaches the zeolites. If the water were not filtered, the débris and impurities would cover the surface of the zeolitic material and prevent full contact of the hard water therewith for the exchange.

I have discovered that it is unnecessary to use sand, quartz, gravel, or the like, for the purpose of distributing the water to the zeolitic material, for these materials not only occupy a great amount of space for a given capacity of softening apparatus, but are inimical to the efficient water softening, zeolitic regenerative process, and necessary washing of the zeolitic material after regeneration. With my invention, the sand, gravel, quartz, and the like, now so universally used as retaining and distributing mediums and which tend to cement together under the action of the constituents and débris carried by hard water, are rendered unnecessary elements. An added advantage of my invention is the incidental filtering action which makes possible its use in connection with turbid waters without a separate or additional filter which must be used with prior water softeners when the water is turbid.

Briefly stated, my invention consists in passing the hard and usually unfiltered water through a diaphragm having interstices or foramina of such extremely small size that the water passing therethrough will be effectively filtered and uniformly distributed over and to the face of a bed of base-exchange mineral without the interposition of sand, gravel, quartz, or the like. This diaphragm has not only extremely fine interstices but they should be approximately uniform in size, closely spaced, and permanently fixed in relation to each other. The base-exchange mineral or zeolite is placed directly upon the diaphragm and thereby supported and retained above the bottom of the softening tank apparatus. The water to be softened is preferably passed upwardly through the diaphragm and through the zeolitic material to the top of the bed thereof from whence it is drawn off for use. Preferably also, a damping space is provided above the top of the bed of zeolitic material or a second diaphragm is interposed between the top of the bed of zeolitic material and the soft water outlet from the apparatus to prevent any zeolitic material which may be carried upwardly by and suspended in the water passing through the bed of mineral from being carried into the service system or to waste.

In the preferred practice of my invention, in regenerating the zeolite, the brine solution or other regenerating agency is passed downwardly in the reverse direction to the passage of water during the softening process and the flow of this material, together with the similar flow of water used for washing the apparatus and zeolite of excess regenerating brine will remove any filtered deposits gathered upon the diaphragm and carry it off therefrom. In this operation, also, a much less amount of regenerating material and water are required.

The diaphragm is preferably filter cloth composed of a fine wire fabric made from a non-corrodible metal providing a maximum of interstices or foramina to give substantially perfect distribution to and an intimate contact of the water with the base-exchange mineral, or with the brine solution used for regenerating. A properly supported filter cloth will also serve to retain the mineral and since the filter cloth is very thin, less space is consumed in the softener apparatus, giving greater capacity for a given size of apparatus or it enables a smaller size apparatus to be substituted for a larger one for the same capacity. The fine mesh of the filter cloth will filter out most material or débris suspended in the water entering the softener and where desired, from the brine or other regenerating agent used, protecting the base-exchange mineral from contamination. A single thickness of the cloth is usually sufficient for its purpose and therefore provides no internal interstices or foramina to become permanently clogged, for the matter filtered from the water will collect on the entering side from which it may be readily removed upon reversal of the flow of water through the softener at each regenerating operation. It will be clear, therefore, that this fine mesh metal filter cloth will retain and protect the base-exchange mineral perfectly and maintain its normal or theoretical life, also insure even distribution of the entering water, and thereby prevent channeling or the formation of preferential passages through the base-exchange material.

When a diaphragm of the character described is utilized at both top and bottom of a bed of base-exchange mineral or zeolite, the size of a water softener of given capacity may be still further reduced, for the dead space necessary where but one diaphragm is used, as above explained, may be cut down or entirely avoided.

I have also found that certain other materials may be utilized to take the place of the filter cloth with substantially equal efficiency although they occupy more space than the cloth and necessarily require slightly larger apparatus for the same capacities. One such material is commercially known under the name of filtros and is composed of particles of sand fused together into a porous mass. When properly manufactured, it is strong enough in slab form to support the base-exchange mineral, and fine enough in texture to prevent the mineral from washing through in one direction or débris carried in with the entering water from passing through it to contaminate the mineral. From its nature, "filtrose" provides more interstices or foramina than sand and gravel, and the interstices or foramina are more uniformly spaced. Auxiliary supports for such material, even for slabs of but 1½" thickness and of relatively great diameter or length, are unnecessary, and it may be cemented in place in the apparatus. Just as one sheet of filter cloth may be used at both top and bottom of the softener apparatus, so may two slabs of filtros be used, one at the top and one at the bottom of the softener, to support and confine the zeolite for either an upward or downward flow of the water to be softened.

Many other materials, such as rotten stone, sintered aluminium oxide, otherwise known as "alundum", and pumice, may also be used.

The invention also contemplates the provision of a settling chamber immediately below the foraminous filter member, so that the heavier foreign constituents of the entering water may drop away from the filter member due to the diminution in velocity of the entering water. All débris collecting on the bottom face of the filter member and in the settling chamber will be washed away and out through a drain outlet during the regenerating process.

A further purpose is the provision of a softener embodying the features and providing the advantages above mentioned so constructed and arranged that it may be manufactured or produced at a comparatively low cost and will serve its purposes in a practical and satisfactory manner, and still further objects should become readily apparent from perusal of the description and claims and from the drawings in which:

Figure 1:
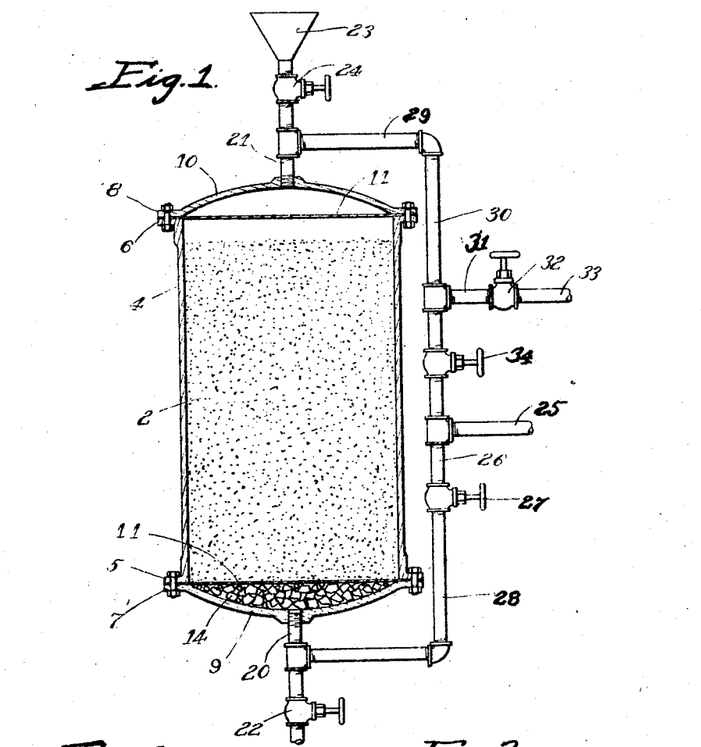
Figure 1 is an elevation of one form of the invention partly in section.

The drawings illustrate one form of my invention in which it is applied to a domestic or household water softening apparatus, that is, one of such size and construction best suited for the needs of the average family or other small user of soft water. It embodies simplicity of construction, involving no complicated system of valves nor difficulties in manipulation or operation inherent in apparatus of this character heretofore constructed and these advantages of design greatly simplify its manipulation for use as a softener or for regenerating and washing after regeneration. Any unskilled person may easily follow the few instructions necessary for its installation and operation. The zeolite or other base-exchange mineral designated 2 is placed within a cylindrical or other suitably formed tank 4 which is preferably supported in an upright position. As shown in Fig. 1, the tank is provided with outwardly flanged rims 5 and 6 for cooperative engagement with outwardly flanged portions 7 and 8 of bottom and top dished ends 9 and 10, respectively.

Figure 2:
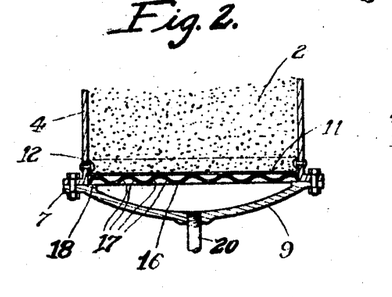
Figure 2 is a fragmentary section of an apparatus embodying my invention with a filter cloth support alternative to the support shown in Figure 1.
Figure 3:
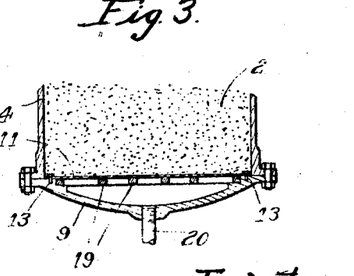
Figure 3 is a view similar to that of Figure 2, showing a still further modification of filter cloth support.

Clamped between the ends and the flanged portions of the tank are sheets or diaphragms of a very fine mesh, non-corroding metal, filter cloth 11, although these sheets or diaphragms may be otherwise secured as shown at 12 in Fig. 2, and at 13 in Fig. 3. The zeolitic material 2 is not supported on a bed of sand or gravel as is often or usually the case in other devices, but is preferably supported directly upon the bottom filter cloth 11 which may be in turn supported by quartz, ceramic material, or other clean rock, or grog 14. Alternatively I may use corrugated metal or other material 16 having a large number of coarse openings 17 therethrough and supported upon the inner shoulders 18 of flanges 7 of the bottom end member 9, or, I may use bars 19 of metal or the like arranged in the form of a grating as shown in Fig. 3. Various other constructions may be used as will be apparent. Suitable packing between the tank wall flanges and the end members may be provided as desired and necessary.

Each end member 9 and 10 is tapped at a suitable point, in this case at the point of maximum depth, to receive pipes 20 and 21. The pipe 20 preferably serves as the inlet pipe for hard water and as a drain outlet connection to drain valve 22 when the zeolitic material 2 is being regenerated, while the pipe 21, in such use, serves as an outlet pipe for soft water to the service system and also as an inlet connection to the tank from funnel 23 through valve 24 for regenerating the mineral. Hard water from any suitable source of supply is carried through the pipe 25 to pipe 26 through valve 27 and connection 28 to the pipe 20 from which it is delivered into the bottom of the tank, passes through the crushed rock 14, is thoroughly filtered and distributed by the filter cloth 11, evenly and uniformly to the zeolitic material through which it passes to the pipe 21, thence through the pipes 29, 30, 31, and valve 32, to the service line 33. A valve 34 is normally closed during the softening operation.

Figures 4, 5:
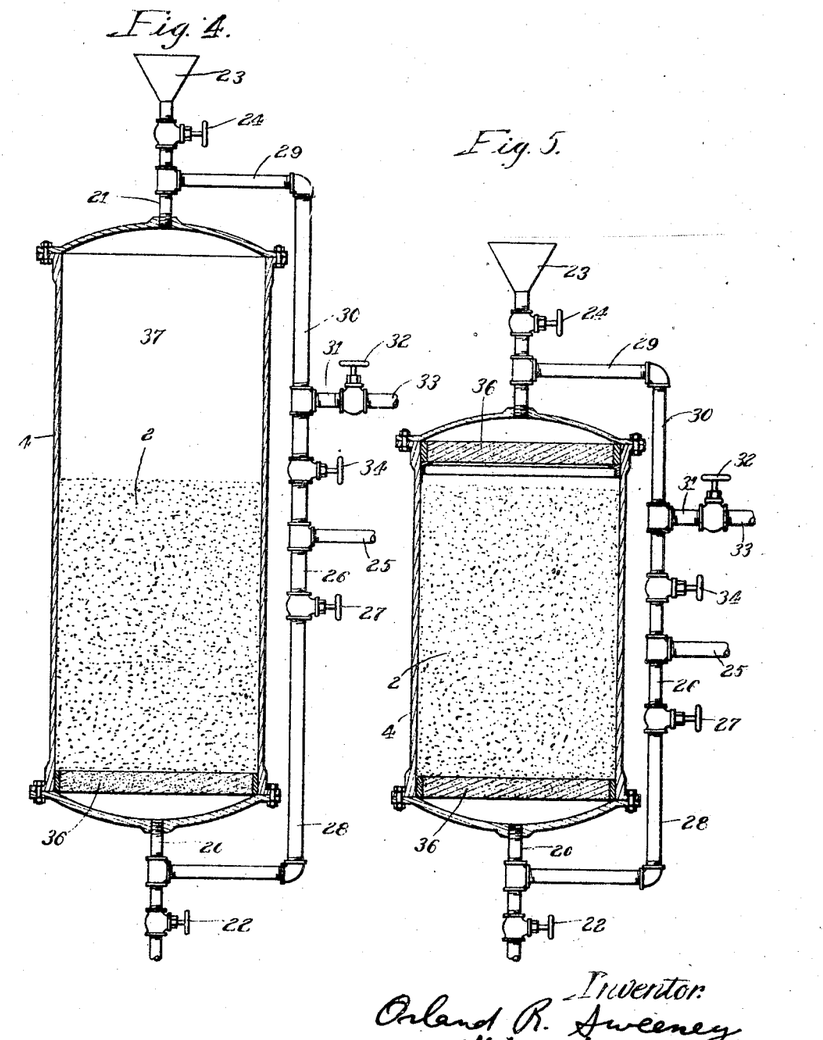
Figures 4 and 5 are similar views to that of Figure 1, showing alternative constructions utilizing a slab of "filtros" or other material hereinbefore specified.
Figure 6:
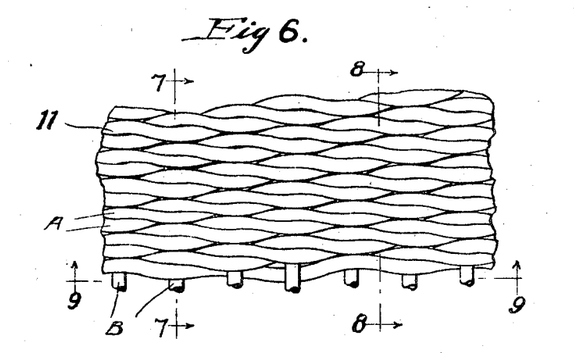
Fig. 6 is a fragmentary face view showing one embodiment of a filter cloth diaphragm used with my invention; and—
Figure 7:
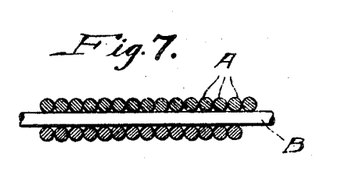
Figs. 7, 8, and 9 are sections taken substantially on the lines 7—7, 8—8, and 9—9, respectively, of Fig. 6, all of the drawings being diagrammatic.
Figure 8:
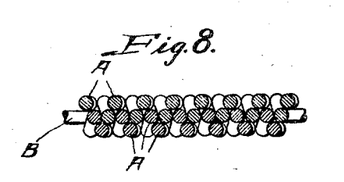
Figure 9:
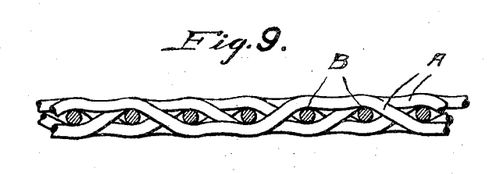

In the modified forms of the invention shown in Figs. 4 and 5, the piping system may be identical, as shown, with the piping system used in the construction illustrated in Fig. 1, but instead of using a filter cloth, a suitable slab of material 36 is substituted therefor. This may be filtros, rotten-stone, sintered aluminium oxide, or alundum, or pumice, secured and supported in any suitable manner within the tank, and in turn preferably supports the zeolitic material directly. If a filter cloth, or a slab of filter material 36 is not used at both top and bottom ends of the zeolitic filtering material, it is preferable to provide a damping space 37 of considerable depth above the top surface of zeolitic material, in order that any finely divided zeolitic or other material carried upward by the passage of water and suspended therein may settle out before the water reaches the outlet pipe 21.

In operation, the zeolitic or other base-exchange material will be poured into the tank to approximately the proportionate levels shown in the drawings. The valves 22, 24, and 34 closed, and the valves 27 and 32 opened. Water from the street main, or other source of supply, entering pipe 25 will pass through pipes 26, 28, and 20 into the bottom of the water softening apparatus where it will be filtered and uniformly distributed to the zeolitic material by the filter cloth 11 over the entire bottom area of the zeolitic material. The water rises through the material and is thereby softened, and passes upwardly through the secondary filter cloth at the top for removal of any suspended zeolitic material, or through the space 37 (Fig. 4) for this purpose, to the outlet pipes 21, 29, 30, 31 and through the valve 32 to the service or house supply pipe 33, to be drawn off through suitable faucets as desired. When regenerating, the valves 22, 27, 32, and 34 are closed and the valve 24 is opened to permit introduction of suitable regenerating materials through the funnel 23 into the tank. The valve 22 may then be opened to permit the regenerating material to pass downwardly into the tank. The valve 24 may be closed at this point and thereafter the valves 34 and 22 are opened to permit water from the street main or supply source to flush out the regenerative matter through the outlet valve 22. After thorough washing, the valves 22 and 34 may be closed, and the valves 27 and 32 opened for normal water softening operation.

By virtue of the provision of a filter cloth and the dispensing with a bed of sand and gravel, I materially lighten the apparatus. This filter cloth may be made from Monel metal, brass, or nickel, or, in fact, any metal which is non-corrodible the strands of which are so closely woven and in some cases given such subsequent treatment that it appears opaque, although the interstices or foramina between the woven strands permit the free passage of water while eliminating débris or matter which may be carried in suspension. The cloth may not only be woven closely, but sometimes, after weaving, it is rolled to flatten and congest the strands to reduce the size and shape of the interstices or formina while retaining a large proportion or ratio of interstices or foramina to the total surface area. This cloth not only filters suspended matter from the water before it enters the mineral bed and distributes it uniformly thereacross, but it will retain the zeolitic material or mineral, it permits the salt solution or other regenerating or revivifying agent to be washed out quickly, insures an intimate contact between the regenerating or revivifying agent and the zeolite during regeneration or revivication, and provides many other advantages and features which make it generally superior to any other material for its purpose of which I am aware.

In use, the metal filter cloth spreads and distributes the water to the bottom surface of the base-exchange mineral at uniform pressure and volume thereover, which is a highly desirable action for the reason that water softening being a chemical contact process between the water and the surface of the zeolitic or other material, the greatest efficiency of operation is obtained when the contact action is uniform throughout the entire cross section of the mineral bed. When sand and gravel or other constructions in use prior to my invention are utilized, the mineral, as well as the sand or gravel, etc., channel and sometimes cement, interfering with thorough operation of the apparatus and destroying its efficiency. Apparatus constructed in accordance with my invention entirely obviate such objections for the water is comingled with the mineral granules in a consistently uniform action across the mineral bed area and throughout its length. Many of these advantages are to be had utilizing a slab or other form of alternative material of the character hereinbefore specified.

Another advantage which is more or less obvious is that matter filtered out from the incoming water will collect in the bottom of the chamber formed between the filter member and the bottom of the tank where it may be washed out during the mineral regenerating or revivifying operation. The filtered out matter, collecting in the bottom of the tank is not appreciably disturbed except upon variation in the velocity of the water entering through the pipe 20, but whether or not it is disturbed, it will not interefere with the proper operation of the apparatus. Again, when two filters are used, one at the bottom and one at the top of the zeolite containing chamber, whether the filter be of metal cloth or of other material, the head room, such as that illustrated at 37 in Fig. 4, which is necessary to prevent the zeolitic material from washing away during operation, if the upward flow method is used, may be materially reduced, if not entirely done away with. Preferably, however, when two filters are used, one at the top and one at the bottom of the zeolitic material, a space of one or two inches may be provided above the mineral to permit the mineral to lift with the upward flow of water to combat any cementing action which may tend to take place.

The special type of filter cloth used should not be confused with an ordinary metal screen for it functions very differently. The cloth made of non-corroding metal has a very high mesh—from approximately 100 to 350 mesh, or finer.

Figs. 6 to 9 inclusive show greatly enlarged views of a single embodiment of filter cloth of the character contemplated by my invention. This particular filter cloth has 250 shoot wires A, and 20 warp wires B to the linear inch, and is known as a twilled weave, 250 by 20 mesh, having 5,000 interstices to the square inch. Commercial filter cloth of numerous other weaves or of a felted character, might also be used, and the mesh, in case of a woven filter cloth, may also vary within a range sufficient to perform the functions disclosed herein. For example, with a 200 by 200 mesh filter cloth there are 40,000 interstices to the square inch. Obviously, the mesh may be finer or coarser than the examples herein specified, and perform the desired functions. Another criteria is the size, and arrangement of the interstices, and the relation of the interstices with respect to each other. In all cases the diaphragm must be composed of a material which is not greatly corroded when in contact with water or brine. It should provide a large number of extremely fine, closely spaced, approximately uniform, and permanently fixed interstices. These interstices must be of such fineness that when water or brine solution is impinged upon the diaphragm, the resistance to the flow at any one point will be great enough to cause the water to uniformly distribute itself over the entire diaphragm. The water coming through the diaphragm should show a level surface to the eye, having no jets due to greater velocity through some interstices than through others when the water is supplied at pressures which are normal to water distributing systems, such pressures being usually up to about 60 pounds to the square inch. Furthermore, there should be such number of interstices that the ratio of the total open area thereof to the total area of the distributing diaphragm is comparatively large so as not to create objectionable pressure drop. The foregoing criteria define what I mean by extremely fine interstices fixed with relation to each other. Furthermore, in the use of filter cloth as a diaphragm, I mean any woven, felted, or matted material having the characteristics and functions above described.

As has been noted before and as will be emphasized here, water softening apparatus, prior to my invention, are not recommended for use with water which may contain suspended matter or matter which will separate out of chemical combination therefrom, in such form, without first treating and filtering the water. My apparatus not only renders this expedient unnecessary, but satisfactorily and efficiently softens water containing almost any suspended matter or iron in solution or which may separate out as suspended matter upon chemical decomposition.

Since the water and mineral are brought into more intimate contact and channeling is prevented, a greater capacity of softened water from a definite amount of mineral is obtained with my apparatus than with the sand and gravel type, and since the salt or other revivifying or regenerating agent and mineral are brought into more intimate contact than with other types of apparatus, quicker and more effective revivification or regeneration for any given mineral is obtained with less salt. Also many other valuable advantages are attained. For instance, where the sand and gravel types of water softening apparatus are used, it is necessary to ship the apparatus separately from the zeolitic or other water softening material, and the sand or gravel to be used, separately from both, because the softener, sand and gravel, would mix during shipping and no longer function as they were intended. When the materials so shipped have reached their destination, it is necessary that the apparatus be assembled and set up by an expert. But with my apparatus, I need no sand or gravel, and since the zeolite is homogeneous, the apparatus may be assembled at its place of manufacture and shipped complete and ready for use at its destination. It will be appreciated that a material saving in cost is effected.

During regeneration, the regenerating agent, which will usually be a sodium chloride solution, or solid sodium chloride, will permeate or diffuse through the bed of mineral reacting with the material to replace calcium, etc., combined therewith with sodium, as hereinbefore explained. The filter cloth or filter material of other character insures a uniformly distributed flow of the regenerating solution over and through the bed of zeolitic material and permits of ready washing out after regeneration. When a filter member is used above the top of the water softening material any débris which may possibly enter with the sodium chloride or solution thereof will be prevented from contaminating the softening material.

My invention as exemplified by the use of a diaphragm of silica or earthy material, or preferably filtros, is claimed in a divisional application.

The invention may be used with either upward or downward flow, although I prefer to use the upward flow as hereinbefore explained, and while I have illustrated but few modifications of my invention, it should be appreciated that many further modifications and changes may be made in the construction, parts, arrangement and operation within the spirit of the invention and the scope of the appended claims.

I claim:

1. In a water softener having a bed of base-exchange material, means for flowing water or brine solution through said material, and a diaphragm having extremely fine interstices, closely and uniformly spaced and permanently fixed for uniformly distributing the flow of said liquid through said material, said interstices being of such size as to prevent channeling under normal operating pressures, to secure more complete chemical exchange.

2. In a base-exchange water softener, in combination, a bed of base-exchange material, a diaphragm having extremely fine, closely spaced and permanently fixed interstices, the resistance of which to the flow of liquid through the softener will cause the liquid to distribute itself over the diaphragm and to pass therethrough at uniform velocity throughout its exposed area, to secure uniform distribution and velocity of the liquid over the cross-sectional area of said material, said interstices being of such size as to prevent channeling under normal operating pressures, to secure more complete chemical exchange.

3. In a base-exchange water softener, in combination, a container having an inlet and an outlet, a bed of base-exchange material in the container, means for flowing water or brine solution through said material in the container, and a diaphragm in the container having extremely fine interstices fixed with relation to each other, said interstices being of such size that when the water or brine solution is impinged upon the diaphragm, the resistance to the flow at any one point will be great enough to cause the liquid to uniformly distribute itself over the exposed area of the diaphragm and to flow therethrough at uniform velocity to obtain a uniform distribution of the liquid through said material to prevent channeling under normal operating pressures and to secure more complete chemical exchange.

4. In a base-exchange water softener, the combination of a container having an inlet and an outlet, a bed of base-exchange material in the container, means for flowing liquid through said material in the container, and a diaphragm for uniformly distributing said liquid through said material, said diaphragm having extremely fine interstices fixed with relation to each other, said interstices being of such size as to prevent channeling under normal operating pressures, the ratio of the total open area of said interstices to the total area of the distributing diaphragm being comparatively large so as not to create objectionable pressure drop.

5. In a base-exchange water softener, the combination of a container having an inlet and an outlet, a bed of base-exchange material in said container, means for flowing a liquid through said material in the container, and a distributing diaphragm in the container, having extremely fine interstices fixed with relation to each other, said interstices being of such size that when the liquid is impinged upon the diaphragm the resistance to the flow at any one point will be great enough to cause the liquid to uniformly distribute itself over the exposed area of the diaphragm and to flow therethrough at uniform velocity to obtain a uniform distribution of the liquid through said material to prevent channeling under normal operating pressures and to secure more complete chemical exchange, the ratio of the total open area of said interstices to the total area of the distributing diaphragm being comparatively large so as not to create objectionable pressure drop.

6. In a water softener, the combination of a bed of base-exchange material, means for flowing a liquid therethrough for effecting a chemical exchange, a diaphragm having extremely fine, uniformly spaced and permanently fixed interstices, the resistance of which will cause the liquid to be distributed across the diaphragm, and which will cause the liquid to flow at uniform velocity throughout the cross-sectional area of said material, said interstices being of such size as to avoid channeling under normal operating pressure and to secure more complete chemical exchange.

7. In a water softener, the combination of a bed of base-exchange material, means for flowing a liquid therethrough for effecting a chemical exchange, a diaphragm having extremely fine, uniformly spaced and permanently fixed interstices, the resistance of which will cause the liquid to be uniformly distributed across the diaphragm, and which will cause the liquid to flow at uniform velocity throughout the cross-sectional area of said material, said interstices being of such size as to prevent channeling under normal operating pressures to secure more complete chemical exchange throughout any cross-section of said bed of material.

8. In a water softener, in combination, a bed of base-exchange material, means for flowing water or brine solution therethrough to effect a chemical exchange, and a diaphragm having extremely fine interstices, closely spaced and permanently fixed for distributing the water across said bed of material, the interstices being so fine that the resistance set up will cause the water to uniformly distribute itself over the exposed area of the diaphragm and to be uniformly distributed by the latter across the bed of softening material to avoid channeling of the liquid flowing through the material under normal operating pressures and to secure more complete chemical exchange under normal functioning.

9. In a water softener, the combination of a bed of base-exchange material, means for flowing a fluid therethrough for effecting a chemical exchange, a diaphragm having interstices so small, closely spaced and permanently fixed as to effectively filter from the liquid foreign matter mechanically suspended therein, to distribute the liquid across the diaphragm, and to cause the liquid to flow at uniform velocity throughout the cross-sectional area of the material and to prevent channeling under normal operating pressures.

10. In a water softener, in combination, a container, a diaphragm within said container, a bed of base-exchange material resting on said diaphragm, and means for flowing water or brine solution through said diaphragm and then said material, said diaphragm having interstices so fine, closely spaced and permanently fixed that it will effectually filter the water flowing to said material and will afford sufficient resistance to the flow of water as to uniformly distribute the water throughout the cross-sectional area of the bed of said material, to avoid the entering of foreign matter in suspension in the water into the material, to avoid channeling of the water flowing through the material, and to secure more complete chemical exchange under normal operating pressures.

11. In a water softener, in combination, a bed of base-exchange material, means for flowing liquid through said material, and a diaphragm of filter cloth for distributing said liquid across said bed of material, said filter cloth having interstices of such size as to prevent channeling under normal operating pressures and to secure more complete chemical exchange.

12. In a water softener, in combination, a container having an inlet and an outlet, a foraminous support in said container intermediate said inlet and outlet, a diaphragm of filter cloth on said support, a bed of base exchange material resting on said diaphragm, and means for causing flow of water through said material and diaphragm in the container, the interstices in said filter cloth being of such size as to prevent channeling under normal operating pressures.

13. In a water softener, in combination, a container having an inlet and an outlet, a foraminous support in said container intermediate said inlet and outlet having comparatively large interstices, a diaphragm on said support having interstices so fine and permanently fixed as to function as filter cloth, a bed of base-exchange material resting on said diaphragm, and means for causing flow of water through said material and diaphragm in the container, said interstices being of such size as to prevent channeling under normal operating pressures.

14. In a water softener, a container having an inlet and an outlet, a bed of base exchange water softening material in said container, and a diaphragm of filter cloth in said container at the inlet side of said material for filtering the water and for uniformly distributing the flow to and throughout the cross-sectional area of said material, the interstices of said filter cloth being of such size as to prevent channeling under normal operating pressures.

15. In a water softener, a container having an inlet and an outlet, a bed of base-exchange water softening material in said container, and a diaphragm of filter cloth in said container at the inlet side of said material for filtering the water and for uniformly distributing the flow to and throughout the cross-sectional area of said material, the interstices of said filter cloth being of such size as to prevent channeling under normal operating pressures, said diaphragm constituting the sole filtering and distributing medium.

16. In a water softener, a container having bottom inlet and top outlet, a bed of base-exchange water softening material in said container, and a diaphragm in said container beneath said material formed of filter cloth serving to retain said bed off the bottom of said container and to filter the water passing upwardly through said container and also to uniformly distribute the flow of the water throughout the cross-sectional area of said material, the interstices of said filter cloth being of such size as to prevent channeling under normal operating pressures.

17. In a water softener, a container having an inlet and an outlet, a bed of base-exchange water softening material in said container between said inlet and outlet, and diaphragms in said container on opposite sides of said bed formed of filter cloth serving to retain said material in the normal and reverse flowing of the water or brine solution through said container and to filter the liquid and uniformly distribute the flow thereof throughout the cross-sectional area of said material, the interstices of said diaphragms being of such size as to prevent channeling under normal operating pressures.

18. In a water softener, in combination, a bed of base-exchange material, means for flowing the liquid therethrough, and a diaphragm having interstices which function as those of filter cloth of approximately 100 mesh, or finer, for distributing the liquid across said bed of material to secure more complete chemical exchange.

19. A base-exchange water softener comprising, in combination, an upright tank having a hard water inlet and a waste outlet at its bottom end, a soft water outlet and a brine inlet at its top, a diaphragm in the bottom of the tank above the hard water inlet having extremely fine, closely spaced and permanently fixed interstices, a bed of base-exchange material in the tank above said diaphragm, said interstices being of such size as to prevent channeling under normal operating pressures, and means for causing flow of water or brine solution through said inlets and outlets whereby to soften the water by the upflow method and to regenerate by the downflow method, the downflow serving to carry away through the waste outlet the foreign matter collected in the bottom of the tank and filtered by said diaphragm.

20. A base-exchange water softener comprising, in combination, a container, a bed of base-exchange material in the container, a diaphragm in the container below said bed of material, said diaphragm having extremely fine, closely arranged and permanently fixed interstices as distinguished from sand, gravel, or quartz beds, means for causing the flow of water upward through the container whereby the water will be filtered by said diaphragm and so uniformly distributed thereby over the cross-sectional area of said material as to prevent channeling therein and secure more complete chemical exchange, the collection of foreign matter in the material being avoided by the filtering action of said diaphragm and the material being in a state of semi-suspension to provide more intimate contact of the upflowing water therewith, and means for causing the flow of a regenerating solution downward through the container whereby to carry away foreign matter filtered out beneath the diaphragm and to regenerate the material without the usual intermediate operation of back-washing.

21. In a base-exchange water softener, in combination, a container, a bed of base-exchange material in said container, means for flowing water or a regenerating solution through said material to effect a chemical exchange, and means in said container for distributing said liquid, said means having interstices of such size and relatively fixed relation as to prevent channeling through said material under normal operating pressures.

22. In a base-exchange water softener, in combination, a container, a bed of base-exchange material in said container, and means for introducing water into said bed at points so numerous and closely and permanently spaced as to prevent channeling under normal operating pressures.

23. In a base-exchange water softener, in combination, a container, a bed of base-exchange material in said container, and means for introducing water into said bed so as to cause a uniform flow of water throughout any transverse cross-section of the bed to prevent channeling under normal operating pressures.

ORLAND RUSSELL SWEENEY.